(12) United States Patent
Holmes

(10) Patent No.: US 7,280,924 B2
(45) Date of Patent: Oct. 9, 2007

(54) SYSTEM AND PROCESS FOR MONITORING THE PRODUCTION OF SYNTHETIC FUEL

(75) Inventor: Richard C. Holmes, 3031 Brook Monte La., Lexington-Fayette, KY (US) 23602

(73) Assignee: Richard C. Holmes, Houston, TX (US)

( * ) Notice: Subject to any disclaimer, the term of this patent is extended or adjusted under 35 U.S.C. 154(b) by 679 days.

(21) Appl. No.: 10/652,535

(22) Filed: Aug. 29, 2003

(65) Prior Publication Data
US 2006/0053685 A1 Mar. 16, 2006

(51) Int. Cl.
*G08F 19/00* (2006.01)
(52) U.S. Cl. ........................................... 702/32; 73/112
(58) Field of Classification Search .................. 702/22, 702/30–32, 45, 156, 173, 182–183; 72/182–183; 44/280, 301, 574, 620; 73/112, 866, 865.8, 73/865.9
See application file for complete search history.

(56) References Cited

U.S. PATENT DOCUMENTS

| | | | | | |
|---|---|---|---|---|---|
| 4,280,817 | A | * | 7/1981 | Chauhan et al. | 44/604 |
| 4,496,286 | A | * | 1/1985 | Gagnon | 417/22 |
| 5,257,586 | A | * | 11/1993 | Davenport | 110/246 |
| 5,513,519 | A | * | 5/1996 | Cauger et al. | 73/112 |
| 5,817,958 | A | * | 10/1998 | Uchida et al. | 73/865.9 |
| 6,383,237 | B1 | * | 5/2002 | Langer et al. | 44/301 |
| 6,691,061 | B1 | * | 2/2004 | Rogers et al. | 702/156 |
| 6,740,133 | B2 | * | 5/2004 | Hundley, Jr. | 44/301 |
| 6,860,911 | B2 | * | 3/2005 | Hundley | 44/620 |
| 6,962,675 | B2 | * | 11/2005 | Lewis et al. | 422/83 |

\* cited by examiner

*Primary Examiner*—Hal Wachsman
*Assistant Examiner*—Mary Catherine Baran
(74) *Attorney, Agent, or Firm*—Fulbright & Jaworski, L.L.P.

(57) ABSTRACT

The present invention is directed to a method and system for monitoring a synthetic fuel process. The system and method entails presenting process information in a form readily understandable by a process monitor. The process information is presented relative to other process information. Presenting the information in such a manner allows the process operator to quickly and accurately monitor and control the process.

44 Claims, 2 Drawing Sheets

SYSTEM AND PROCESS FOR MONITORING THE PRODUCTION OF SYNTHETIC FUEL

BACKGROUND OF THE INVENTION

Developing efficient means for producing alternative fuel sources is important in societies dependent on fuel. The process for developing solid synthetic fuel ("synfuel") from coal is one such alternative. Briefly, the synfuel process involves the steps of treating coal with a chemical change agent to produce synfuel. The chemical change agent often comprises a latex and water. The ratio of latex to water depends on the brand of latex. After being processed with the chemical change agent, the synfuel is ready to be sold. The synfuel is generally sold to utility customers that burn coal and/or synfuel to generate power.

The amount of chemical change agent that must be applied to the coal to produce synthetic fuel falls within a narrow range. If too little chemical change agent is applied, a uniform synfuel product will not be produced. If too much chemical change agent is applied, the cost of the synfuel is dramatically increased. The reason for this is that the cost of latex per ton is approximately twenty times higher than the cost of coal per ton. Seemingly small increases in the amount of chemical change agent applied to a given amount of coal have a significant impact on the cost of the synfuel. As a result of the cost of the chemical change agent, a synfuel process should use the appropriate amount of chemical change agent to produce synfuel.

Operational fluctuations in the amount of coal feedstock being processed makes it difficult to determine how much chemical change agent should be applied to coal feedstock at a given time. Often, the amount of chemical change agent applied is based on the weight of coal feedstock processed plus a safety factor. The safety factor represents excess chemical change agent applied to coal feedstock to ensure that no coal feedstock escapes processing. Generally, the safety factor is based on expected fluctuations in the amount of coal feedstock processed and the confidence the synfuel process operator has in the available process data.

The present invention contemplates a process whereby process data is gathered about the synfuel process and is converted into information that is presented graphically in a manner that is usable by the process operator. The information is presented in a way that allows the process operator to quickly and easily determine how the process is operating. Often, process information represents dimensionless ratios that are scaled such that their relative positions provides the process operator with information. In this manner, the process operator is able to determine how the process is operating by looking at the relative positions of plots. By using summary process information, a process operator is more readily able to reduce the safety factor, thereby increasing the efficiency of the process.

BRIEF SUMMARY OF THE INVENTION

One aspect of the present invention is a system for monitoring a process for making synthetic fuel, said system comprising a synfuel sensor positioned in operable association with the process to collect synfuel data, a chemical change agent sensor positioned in operable association with the process to collect chemical change agent data, a programmable logic control configured to receive process data, which process data includes the synfuel data and chemical change agent data, and derives therefrom process information, and a display unit configured to receive and display the process information.

In a specific embodiment of a system for monitoring a process for making synthetic fuel a coal feedstock sensor is positioned in operable association with the process to collect coal feedstock data, and wherein the process data includes the coal feedstock data.

In another specific embodiment of a system for monitoring a process for making synthetic fuel a synfuel speed sensor positioned in operable association with the process to collect synfuel speed data, and wherein the process data includes synfuel speed data.

In another specific embodiment of a system for monitoring a process for making synthetic fuel a coal feedstock speed sensor is positioned in operable association with the process to collect coal feedstock speed data, and wherein the process data includes coal feedstock speed data.

In another specific embodiment of a system for monitoring a process for making synthetic fuel a water sensor is positioned in operable association with the process to collect water data, and wherein the process data received by the programmable logic unit includes the water data.

In another specific embodiment of a system for monitoring a process for making synthetic fuel the synfuel sensor is comprised of a scale positioned to weight synfuel.

In another specific embodiment of a system for monitoring a process for making synthetic fuel the coal feedstock sensor is comprised of a scale configured to weight coal feedstock.

In another specific embodiment of a system for monitoring a process for making synthetic fuel the chemical change agent sensor is comprised of a flow meter configured to measure the flow of chemical change agent.

In another specific embodiment of a system for monitoring a process for making synthetic fuel the display includes a graph with plots of select process information.

In another specific embodiment of a system for monitoring a process for making synthetic fuel the select process information displayed on the graph includes the weight of the synfuel produced as a function of time.

In another specific embodiment of a system for monitoring a process for making synthetic fuel the select process information displayed on the graph includes the amount of chemical change agent used as a function of time.

In another specific embodiment of a system for monitoring a process for making synthetic fuel the select process information displayed on the graph includes the ratio of the amount of chemical change agent used to the amount of coal feedstock used.

In another specific embodiment of a system for monitoring a process for making synthetic fuel the graph is circular and may represent twenty-four (24) hours.

In another specific embodiment of a system for monitoring a process for making synthetic fuel the select process information is scaled such that no two plots cross or plot along the same line.

In another specific embodiment of a system for monitoring a process for making synthetic fuel a camera is positioned relative to the chart to generate an image of the chart, said image being adapted to be displayed at remote locations. The image may also be made available for viewing via the Internet.

In another specific embodiment of a system for monitoring a process for making synthetic fuel an alert message is sent when the process information falls outside of a predetermined range. The alert message may be sent via email or displayed on the operator's control panels/monitors. The alert message may be a text message, audible alarm, and/or flashing lights.

Another aspect of the invention is a system for graphically displaying process information, said system comprising process sensors operably positioned with respect to a synfuel process for generating process data, which process data includes coal feedstock data and chemical change agent data, a data processing unit configured to receive process data and derive therefrom process information, and a graphing unit configured to received process information, wherein the graphing unit displays select process information, which select process information includes information on the coal feedstock and the chemical change agent.

Another aspect of the invention is a method of monitoring a synthetic fuel process, said method comprising the steps of, collecting process data, which process data includes coal feedstock data and chemical change agent data, deriving process information from the process data; and displaying select process information, which select process information includes the amount of coal feedstock entering the process and the amount of chemical change agent applied to the coal feedstock.

In another specific embodiment of the method of monitoring a synthetic fuel process the select process data includes synfuel data, and the displayed process information includes the amount of synfuel produced.

In another specific embodiment of the method of monitoring a synthetic fuel process select process data includes the water data, and the displayed process information includes the amount of water mixed with the chemical change agent.

In another specific embodiment of the method of monitoring a synthetic fuel process the select process data includes chemical change agent data, and the displayed process information includes the ratio of chemical change agent and water to coal feedstock.

In another specific embodiment of the method of monitoring a synthetic fuel process the select process information is represented by plots on a graph.

In another specific embodiment of the method of monitoring a synthetic fuel process the graph is a circular graph.

In another specific embodiment of the method of monitoring a synthetic fuel process the display includes at least four (4) plots.

In another specific embodiment of the method of monitoring a synthetic fuel process the method further comprises the step of scaling the at least four plots so that no two plots cross under normal operating conditions.

In another specific embodiment of the method of monitoring a synthetic fuel process the method further comprises the step of scaling at least two plots so that the scaled plots overlap under normal operating conditions.

In another specific embodiment of the method of monitoring a synthetic fuel process the method further comprises the step viewing the graph remotely.

In another specific embodiment of the method of monitoring a synthetic fuel process the method further comprises the steps of generating an electric image of the graph, and viewing the electronic image from a remote location.

In another specific embodiment of the method of monitoring a synthetic fuel process the circular graph represents twenty-four (24) hours.

In another specific embodiment of the method of monitoring a synthetic fuel process the method further comprises the step of time averaging at least one of the plots.

In another specific embodiment of the method of monitoring a synthetic fuel process the method further comprises the step of time averaging the at least four plots.

In another specific embodiment of the method of monitoring a synthetic fuel process the method further comprises the step of saving electronically the process data.

Another aspect of the invention is a process for making synfuel comprising the steps of transporting coal feedstock to a synfuel processing facility, sensing process data, which process data includes coal feedstock data and chemical change agent data, deriving process information from the process data, which process information includes chemical change agent information and coal feedstock information, applying chemical change agent to the coal feedstock based on the process information, and plotting select process information on a graph.

In another embodiment of the process for making synfuel the process data includes synfuel data and the process information includes synfuel information derived from the synfuel data.

In another embodiment of the process for making synfuel the graph is circular and the select process information plotted on the graph includes chemical change agent information and synfuel information.

In another embodiment of the process for making synfuel the graph represents twenty-four (24) hours.

In another embodiment of the process for making synfuel the graph includes at least four plot lines.

In another embodiment of the process for making synfuel the select process information is scaled such that no two plots cross.

In another embodiment of the process for making synfuel the process information is scaled to plot along the same line.

In another embodiment of the process for making synfuel the system further comprises a camera positioned relative to the chart for generating an image of the chart, said images being adapted to be viewed from remote locations.

In another embodiment of the process for making synfuel the images are made available over the Internet.

In another embodiment of the process for making synfuel an alert message is sent when the process information falls outside of a predetermined range.

In another embodiment of the process for making synfuel the display unit is used to graph the process information, which display unit comprises, a circular chart; at least four pen arms, each pen arm having a free end and a fixed end; at least four pens; wherein a pen is located at the free end of each pen arm and the fixed end of each pen arm is operably positioned with respect to the chart to graph the process information.

In another embodiment of the process for making synfuel the graph is presented on a video monitor.

In another embodiment of the process for making synfuel the amount of chemical change agent applied is password protected.

In another embodiment of the process for making synfuel the changes to the amount of chemical change agent applied require entry of personal identification numbers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention relates to a unique system and process for monitoring the production of synfuel. One embodiment of the process is illustrated by FIG. 1, which is described immediately below.

Figure 1:
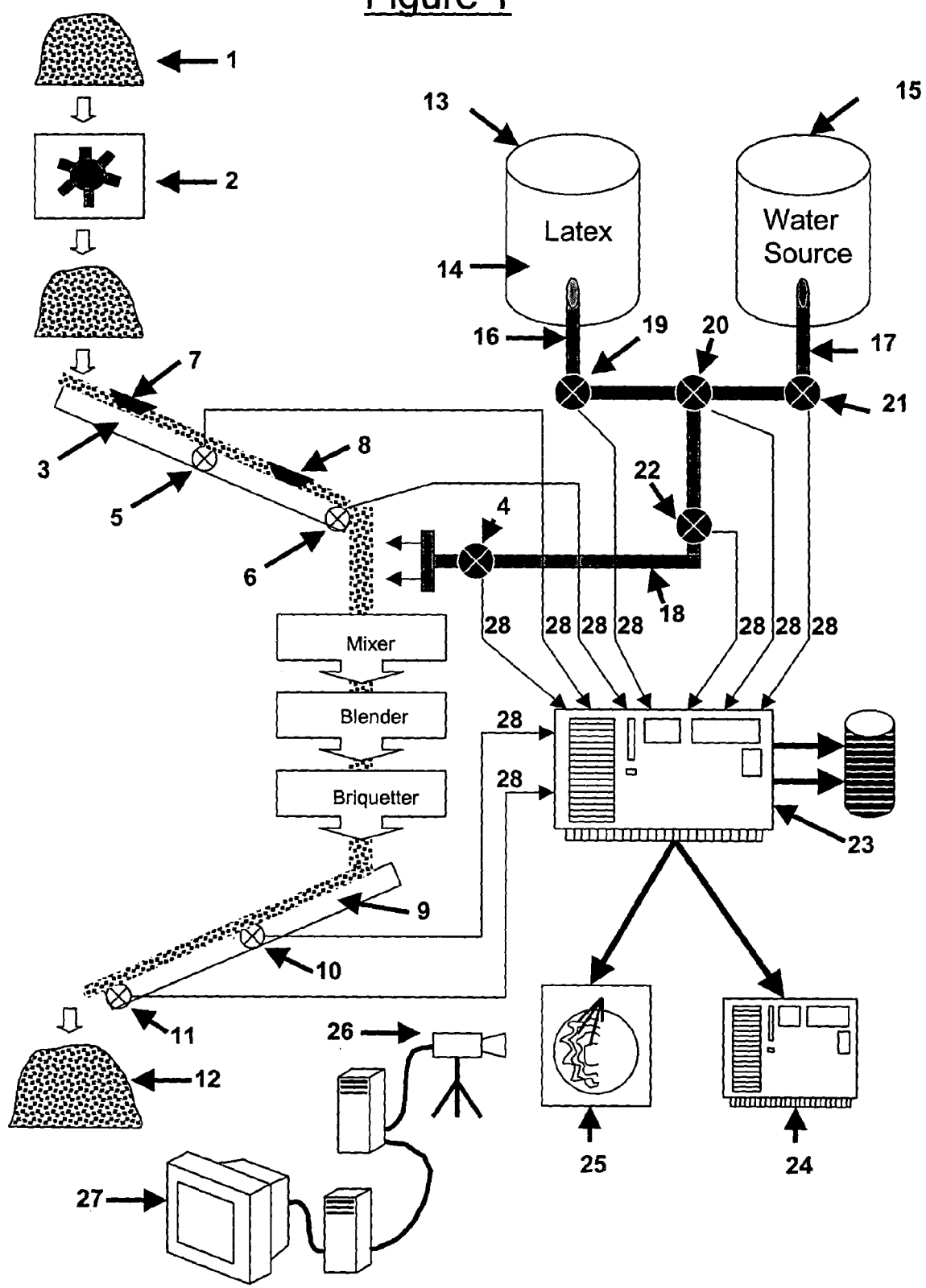
FIG. 1 is a process schematic of the system and method of monitoring and controlling the quality of synfuel produced by a process of treating the coal feedstock with a chemical change agent.

According to FIG. 1, coal feedstock is transported to or near the synthetic fuel facility and stored in a staging area (1). The coal feedstock in staging area (1) is characterized by the varying sizes of the individual pieces of coal. The pieces of coal may range in size from two inches or greater in diameter to powder. From the staging area, the coal feedstock is transported to crusher (2). The crusher (2) breaks up the larger pieces of coal feedstock. Once crushed, the coal feedstock ranges in size from approximately one inch in diameter to powder. The crushed coal feedstock is then transported via coal feedstock conveyor belt (3) to the chemical change agent sprayer (4). The coal feedstock conveyor belt (3) includes a weight sensor (5) configured to weigh the crushed coal feedstock as it is transported on coal feedstock conveyor belt (3). The coal feedstock conveyor belt (3) also includes a speed sensor (6) for providing data on the speed of the coal feedstock conveyor belt (3). Thus, while the data from weight sensor (5) represents an instantaneous weight reading, it can be combined with the speed of the coal feedstock conveyor belt (3) to provide the weight of crushed coal feedstock as a function of time. In the preferred embodiment, process information on the amount of crushed coal feedstock transported on the coal feedstock conveyor belt (3) is presented in tons/hour.

FIG. 1 shows the weight sensor (5) and speed sensor (6) as separate sensors. It is readily understood that the sensors may be combined into one unit. Further, it is understood that the crushed coal feedstock is weighed while it is transported on the conveyor belt in a continuous fashion. The weight sensors generate data representing the weight of the coal feedstock on the conveyor belt as it crosses the weight sensor.

The length of the weight sensor itself varies depending on the application. In some applications, the weight sensor may run substantially the entire length of the conveyor belt. In other applications, the weight sensor may make up only a small fraction of the length of the conveyor belt. Further, multiple scales of varying lengths may be used in combination to create an effective weight sensor length.

The frequency of its readings vary according to the application and the accuracy required. For example, in those cases in which a lower level of accuracy is acceptable, the weight sensor may take weight readings of the coal at lower frequencies, meaning that certain individual coal particles do not get weighed at all and, at most, once as they move along the conveyor belt. In contrast, higher accuracy may dictate more frequent measurements. The weight readings can also be a function of the speed of the conveyor belt such that each particle of crushed coal feedstock is weighed a predictable number of times.

The coal feedstock weight readings may be time averaged. In time averaging applications, the weight data represents an average of different weight readings. Averaging different weight readings smoothes out the natural fluctuations in the instantaneous measurements. For example, weight readings may be time averaged to reduce the fluctuations caused by variances in coal feedstock particles size, distribution of coal feedstock on the conveyor belt, and the stiffness of the conveyor belt.

The crushed coal feedstock, at the transfer point at the end of the coal feedstock conveyor belt (3), is treated with the chemical change agent by the chemical change agent sprayer (4). One skilled in the art understands that coal feedstock may be treated with chemical change agent at other locations within the process. The chemical change agent sprayer (4) applies the chemical change agent to the crushed coal feedstock in predetermined amounts. The amount of chemical change agent applied depends on the amount of coal feedstock and the brand of latex used and its degree of emulsification. The chemical change agent sprayer (4) sprays the chemical change agent across the width of the crushed coal feedstock, thereby coating the crushed coal feedstock. Coal feedstock treated with the chemical change agent and the synthetic fuel process is referred to as synthetic fuel ("synfuel").

The coal feedstock conveyor belt (3) may also be equipped with coal guides, (7) and (8). The coal guides are shaped to distribute the crushed coal feedstock uniformly across the width of the coal feedstock conveyor belt (3). The upstream coal guide (7) helps distribute the coal for more accurate weight readings. The downstream coal guide (8) helps confine the crushed coal feedstock into a defined area across the width of the coal feedstock conveyor belt (3). By confining the crushed coal feedstock to a defined area across the coal feedstock conveyor belt (3), the width of chemical change agent sprayed from sprayer (4) can be controlled such that chemical change agent is not wasted on regions that do not carry crushed coal feedstock.

Coal feedstock speed sensor (6) is shown associated with the end roller of the coal feedstock conveyor belt (3). In such a configuration, the speed sensor outputs data representing the rotational velocity of the end roller. From the rotational velocity, the speed of the conveyor belt can be determined. A skilled artisan readily understands, however, that any number of mechanisms exists for determining the speed of the conveyor belt.

FIG. 1 shows the coal feedstock speed sensor (6) and weight sensor (5) as separate units. As noted previously, the skilled artisan understands that speed sensor (6) and weight sensor (5) may be combined into a single sensor.

Synfuel conveyor belt (9) receives the synfuel—crushed coal feedstock treated with the chemical change agent and the synfuel process—and transports the synfuel to a synfuel storage area (12). From the synfuel storage area (12), the synfuel is transported to customers.

The synfuel conveyor belt (9) is configured with a synfuel weight sensor (10) and synfuel speed sensor (11). The synfuel weight sensor (10) and synfuel speed sensor (11) are similar to the coal feedstock weight sensor (5) and coal feedstock speed sensor (6).

The speed of coal feedstock conveyor belt (3) and the synfuel conveyor belt (9) may be the same, but do not have to be. In one application, the synfuel conveyor belt is operated at a higher speed to spread the synfuel across a greater conveyor belt surface area.

FIG. 1 shows two conveyor belts, (3) and (9). However, a skilled artisan readily understands that a single or multiple conveyor belts can be used.

Between conveyor belt (3) and conveyor belt (9), the coal feedstock is treated with the chemical change agent and is processed using a mixer, blender, and briquetter. A skilled artisan understands that in certain applications, one, two, or all three of the pieces of equipment (mixer, blender, briquetter) may be used. A skilled artisan also understands that in certain applications a pelletizer may be used in the place of a briquetter.

FIG. 1 shows the relative positioning of various components. A skilled artisan understands that the relative positioning may be varied to suit particular space and application requirements. For example, the coal feedstock weight sensor (5) may be positioned anywhere along the coal feedstock conveyor belt, upstream of sprayer (4). In one embodiment of applicant's invention, the weight sensor is positioned just prior to sprayer (4). When coal feedstock guide (8) is used, weight sensor (5) may be positioned downstream of coal feedstock guide (8) to more accurately weigh the coal feedstock prior to sprayer (4).

FIG. 1 shows representations of the numbers of different process components. A skilled artisan understands that the number of components can be varied to suit particular space and application requirements. For example, multiple sprayers (4) may be used to apply chemical change agent. In a configuration with multiple sprayers (4), the sprayers (4) may be positioned upstream and downstream of the drop between coal feedstock conveyor belt (3) and synfuel conveyor belt (9).

FIG. 1 shows latex tank (13) for storing latex (14). The latex tank (13) is configured to store and supply latex (14) to the synfuel process. Latex (13) may be selected from a number of manufacturers, including Nalco, Covol, and Accretions Technologies. Table 1 shows a selection of chemical reagents that can be used to make synfuel.

TABLE 1

Chemical Reagents

Nalco 7899
Nalco 8803
Nalco 7890/9838
Accretion FTH-100
Accretion FTH-200
Accretion FTH-300
Heritage (HES, ECS, ECS Modified)
CLC-1
CLC-3
Covel 298
Covel 298-1

A skilled artisan understands that multiple latex tanks (13) may be configured to supply latex to the synfuel process shown in FIG. 1. In one embodiment, latex supplied by different manufacturers are stored in separate tanks.

FIG. 1 shows water source (15). The water source is configured to supply water to the synfuel process.

The latex tank (13) and the water source (15) are connected to the synfuel process by flow lines 16, 17, and 18. The latex flow line (16) connects the latex tank (13) to the mixed flow line (18). The water flow line (17) connects the water source (15) to the mixed flow line (18). The latex flow line (16) and the water flow line (17) are connected at the mixing station (20). The mixing station (20) operates to merge the latex and water, if any, to form the final chemical change agent emulsion. The mixing station may also include a merging chamber, not shown, adapted to more completely mix the latex (14) and water. The mixing station (20) may also include a number of valves and pumps to mix precise ratios of latex and water. The mixed flow line connects the mixing station (20) to the sprayer (4).

In the preferred embodiment, the latex flow line (16), water flow line (17), and mixed flow line (18) each have a flow sensor, 19, 21, and 22, positioned to take readings on the fluid flow through the respective lines.

The synfuel system also includes bypass lines, not shown, for the latex and water. The bypass lines are configured to supply the synfuel process with water and latex in the event that the mixing station malfunctions. The bypass lines are configured to bypass the mixing station and feed directly into the mixed flow line (18), upstream of the sprayer (4). The bypass lines contain simple flow control valves (21 and 22) that can be manually set to obtain an optimal mix of water and latex.

All of the sensors shown in FIG. 1 output data on their associated process variables. The data is output to the Programmable Logic Control ("PLC") (23). Collectively, the sensor data is referred to as process data. Process data is a general term representing various process readings and measurements taken at various stages of the synfuel process. Often, though not necessarily all the time, the process data is raw data. Process data represents the actual signals output by the sensors.

The process data is input via communication lines (28) to the PLC (23). The PLC (23) is configured to received the process data and derive therefrom process information. Process information is process data that is adapted to be used by the synfuel process operator to monitor the synfuel process. Depending on the sensors used, converting process data into process information often requires some level of manipulation. For example, flow sensors may output flow data in volume/time, such gallons per minute. Converting flow data from units of volume/time into units of weight/time requires processing. Alternatively, sensors may output data in a form that has no significance without further processing. For example, a sensor may output data in the form of electrical values. In this case, the PLC (23) converts the electric values into process information, which process information is readily usable and understandable by the process operator. Process data from a sensor may be usable and understandable by the process operator without further processing. In this case, the process data and the process information are the same.

Process information may be derived from process data, process information, or a combination of process data and process information. Table 2 shows a number of different process information variables and how they are derived. Table 2 is not intended to be exclusive. A skilled artisan understands that additional process data may be gathered, such as temperature, to generate additional process information. Further, a skilled artisan knows that different combinations of process data and process information from those shown in Table 2 may be used.

TABLE 2

| Process Information | Derived From: | Units |
| --- | --- | --- |
| Coal Feedstock | Coal Feedstock Weight Data And Coal Feedstock Speed Data | Tons/Hour |
| Synfuel | Synfuel Weight Data And Synfuel Speed Data | Tons/Hour |
| Latex | Latex Flow Data | Pounds/Hour |
| Water | Water Flow Data | Pounds/Hour |
| Chemical Change Agent | Chemical Change Agent Data | Pounds/Hour |
| Latex/Coal Feedstock | Latex/Coal Feedstock | Dimensionless |
| Latex/Synfuel | Latex/Synfuel | Dimensionless |
| Latex/Water | Latex/Water | Dimensionless |
| Latex/Chemical Change Agent | Latex/Chemical Change Agent | Dimensionless |
| Chemical Change Agent/Coal Feedstock | Chemical Change Agent/Coal Feedstock | Dimensionless |
| Chemical Change Agent/Synfuel | Chemical Change Agent/Synfuel | Dimensionless |
| Chemical Change Agent/Water | Chemical Change Agent/Water | Dimensionless |
| Chemical Change Agent/Latex | Chemical Change Agent/Latex | Dimensionless |
| Water/Coal feedstock | Water/Coal feedstock | Dimensionless |
| Water/Synfuel | Water/Synfuel | Dimensionless |
| Water/Chemical Change Agent | Water/Chemical Change Agent | Dimensionless |
| Water/Latex | Water/Latex | Dimensionless |
| Coal Feedstock/Synfuel | Coal Feedstock/Synfuel | Dimensionless |
| Coal Feedstock/Latex | Coal Feedstock/Latex | Dimensionless |
| Coal Feedstock/Water | Coal Feedstock/Water | Dimensionless |
| Coal Feedstock/Chemical Change Agent | Coal Feedstock/Chemical Change Agent | Dimensionless |
| Synfuel/Coal Feedstock | Synfuel/Coal Feedstock | Dimensionless |
| Synfuel/Latex | Synfuel/Latex | Dimensionless |
| Synfuel/Water | Synfuel/Water | Dimensionless |
| Synfuel/Chemical Change Agent | Synfuel/Chemical Change Agent | Dimensionless |

Though Table 2 shows dimensions for some process information variables, the skilled artisan knows that the units may be adapted for a particular use. For example, coal feedstock can be reported in pounds/minute. Process information may also be adapted for metric units.

The PLC (23) may be programmed to assume control of the synfuel process or to act in a reporting capacity. For example, the PLC (23) may be programmed to maintain a particular ratio of latex to coal feedstock. Alternatively, the PLC (23) roll may be limited to providing process information to the process operator. In this case, the process operator controls the process based on the process information. In a further embodiment, control of the process variables are password protected. In such a configuration, some or all of the process variables cannot be adjusted without a password. Further, different passwords may be associated with different process variables.

The PLC (23) is connected to the control panel (24). The control panel (24) displays selected process information. In a preferred embodiment, the selected process information is displayed in graphic form on a chart recorder (25). It is understood, however, that control panel (24) can be adapted to display information in a number of different ways. For example, the control panel (24) can be adapted to display process information on a video screen, which video screen graphically displays the process information. The video screen can be adapted to display electronically the same information that is plotted on paper by the chart recorder (25).

FIG. 1 shows the control panel (24) and chart recorder (25) as separate components. A skilled artisan understands that the two components could be combined or even split into multiple components. As noted above, the chart recorder may be a conventional paper recorder or it may be an electronic graph.

FIG. 1 shows camera (26) positioned to capture images of the control panel (24) and/or the chart recorder (25). The images captured by camera (26) are available for viewing from remote locations (27). In a preferred embodiment, the images are available via the internet. It is also understood that the images may be broadcast or supplied via direct cable connections to remote locations.

In one embodiment, process data and process information are saved and stored electronically. In a preferred embodiment, the data and information are saved to a computer hard drive. It is understood that the data and information may be saved in any other suitable means.

FIGS. 2(a)-(d) shows various embodiments of the graphs used to display select process information. The process information is displayed in a manner that is readily understood by the operator and which is descriptive of the performance of the synfuel process.

Figure 2A:
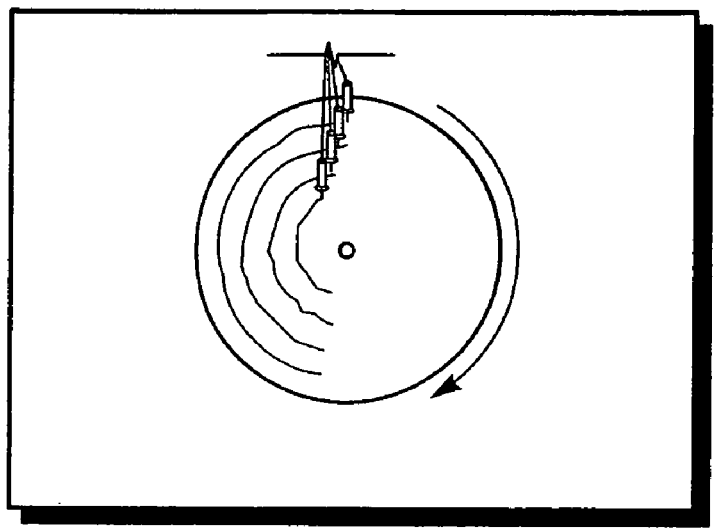
FIG. 2a-d are illustrations of various graphs used to monitor the synfuel process.

FIG. 2(a) is a preferred embodiment. FIG. 2 (a) is a circular graph with four different plot lines representing different process information variables. In the embodiment shown in FIG. 2(a), the plot lines are scaled so that no two lines cross under normal process operation. In a further embodiment, the plot lines are scaled to be spaced evenly across the graph. In such a configuration, the operator can readily view the graph and discern whether the process is operating within a defined range. In essence, the chart recorder presents the process information in a way that allows an observer to monitor a process based on the relationships between the graphs. Thus, the charts are scaled such that the plots' relative positions provide information on the performance of the synfuel process. In this manner, the plots can be more readily viewed via remote viewing, where detail may be hard to discern.

In one embodiment, the process information variables are displayed in different colors. In a further embodiment, the process information variables are displayed in different line types, such as dashed, dotted, solid, and center line. In a still further embodiment, the process information lines are displayed with lines of different thickness. In each embodiment, it is preferable that the lines are displayed in a manner that allows an operator to distinguish the different process information graphs.

In one embodiment, the change in the difference between process information variables are plotted. In effect, the plots represent the slope of the differences between the process information variables.

In one embodiment of the invention disclosed herein, the process information graph includes projections based on current trend in the plots. In effect, the graphs are extrapolated to highlight trends. The distance into the future a graph is extrapolated may be readily determined by a skilled artisan. Such distance depends on the scale of the graph and the particular application. For example, a twenty-four (24) hour chart may project a current trend one hour into the future.

In a preferred embodiment, the plot lines represent 1) the coal feedstock rate, 2) the synfuel rate, 3) the chemical change agent rate, and 4) the ratio of chemical change agent rate to coal feedstock rate. Each process information variable is scaled as necessary to distribute the plots across the face of a graph. The plots are distributed such that no two plots cross under normal operating conditions. Additionally, each graph represents a twenty-four (24) hour period. The plots are also plotted on a circular graph, as shown in FIG. 2 (a).

Figure 2B:
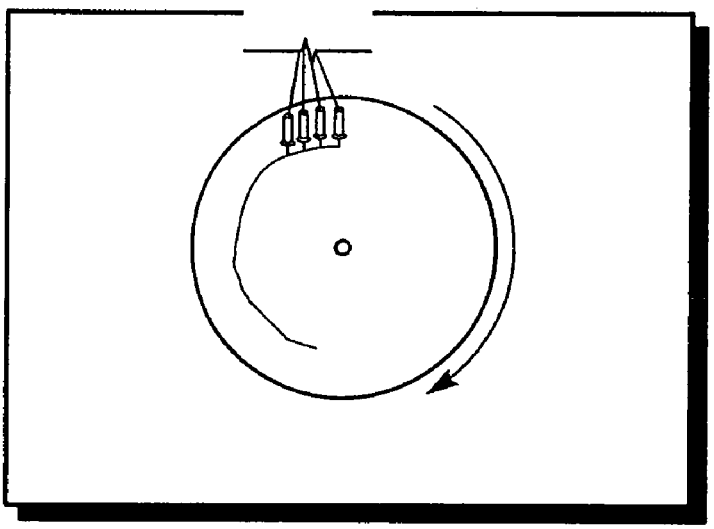

FIG. 2(b) shows an alternative plot to FIG. 2(a). In FIG. 2(b) the plot lines are scaled to plot along the same line. In such a plot, the plot would only show multiple plot lines when the process was not operating under expected conditions.

Figure 2C:
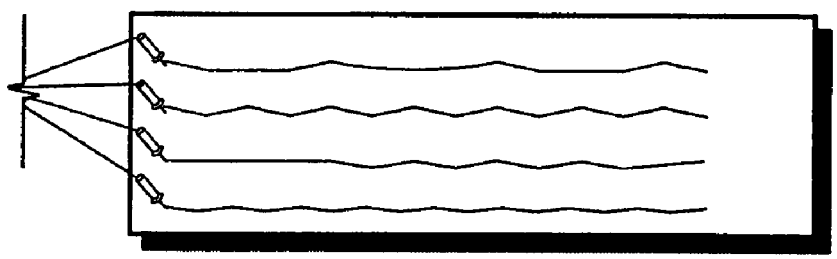
Figure 2D:

FIG. 2(c) is the same plot shown in FIG. 2(a) except the process information is plotted on a rectangular graph instead of a circular graph. In the same way, FIG. 2(d) is similar to FIG. 2(b) except for the shape of the graph.

Specific process data does not give the process operator the overall picture of how a process is operating. It is often time consuming and cumbersome for the process operator to gather and evaluate process data. Further, making decisions based on process data can be time consuming and misleading. The advantages of the disclosed system and process, therefore, relate to the ability of a process operator to make quick, accurate decisions on the operation of a process. According to the disclosed system and process, relevant process information is presented in a manner that is representative of the overall process operation.

Additionally, presenting the process information graphically allows the process to be accurately monitored from a remote location. Because the graphical representations rely on relative relationships and not absolute values, image resolution is less important. Relationships between plot lines can be seen and understood in resolutions in which data values could not.

The process information is derived based on relationships between process variables that are descriptive of the process operation. As disclosed above, process information representing the coal feedstock rate, the synfuel rate, the chemical change agent rate, and the ratio of chemical change agent rate to coal feedstock rate have been found to be particularly descriptive.

Data on different process variables are input from any number of sensors monitoring different aspects of the process. The sensors described herein represent merely a selection of the possibilities.

While a preferred embodiment involves using the summary process information to operate a synfuel process, it is contemplated that the disclosed system and process is easily adapted for other processes.

In view of the above explanations of exemplary systems, components of such systems, and operation of such systems, it will be appreciated by a person of ordinary skill that other embodiments of the present invention may be employed in many applications and that various changes and modifications can be made without departing from the sprit of the invention. All of such changes and modifications are contemplated as being within the scope of the present invention as defined by the following claims.

What is claimed is:

1. A system for monitoring a process for making synthetic fuel, said system comprising:
   a chemical change agent sensor positioned in operable association with the process to collect chemical change agent data;
   a coal feedstock sensor positioned in operable association with the process to collect coal feedstock data;
   a water sensor positioned in operable association with the process to collect water data;
   a programmable logic control configured to receive process data, which process data includes the chemical change agent data, coal feedstock data, and water data and derives therefrom process information that includes the ratio of chemical change agent and water to coal feedstock; and
   a display unit configured to receive and display the process information.

2. The system of claim 1, further comprising,
   a synfuel speed sensor positioned in operable association with the process to collect synfuel speed data, and wherein the process data includes synfuel speed data.

3. The system of claim 2, further comprising,
   a coal feedstock speed sensor positioned in operable association with the process to collect coal feedstock speed data, and wherein the process data includes coal feedstock speed data.

4. The system of claim 3, wherein, the synfuel sensor is comprised of a scale positioned to weigh synfuel.

5. The system of claim 4, wherein the coal feedstock sensor is comprised of a scale configured to weigh coal feedstock.

6. The system of claim 5, wherein the chemical change agent sensor is comprised of a flow meter configured to measure the flow of chemical change agent.

7. The system of claim 6, wherein the display includes a graph with plots of select process information.

8. The system of claim 6, wherein the select process information displayed on the graph includes the weight of the synfliel produced as a function of time.

9. The system of claim 8, wherein the select process information displayed on the graph includes the amount of chemical change agent used as a function of time.

10. The system of claim 9, wherein the select process information displayed on the graph includes the ratio of the amount of chemical change agent used to the amount of coal feedstock used.

11. The system of claim 10, wherein the graph is circular.

12. The system of claim 11, wherein an alert message is sent when the process information falls outside of a predetermined range.

13. The system of claim 12, wherein the alert message is an email, a message displayed on a control panel or monitor, an audible alarm, or a flashing light.

14. The system of claim 11, wherein the graph represents twenty-four (24) hours.

15. The system of claim 11, wherein the select process information is scaled such that no two plots cross.

16. The system of claim 11, wherein the select process information is scaled to plot along the same line.

17. The system of claim 11, wherein the system further comprises,
   a camera positioned relative to the chart to generate an image of the chart, said image being adapted to be displayed at remote locations.

18. The system of claim 17, wherein the images are available via the Internet.

19. A method of monitoring a synthetic fuel process, said method comprising the steps of,
collecting process data, which process data includes coal feedstock data, chemical change agent data, water data, and synfuel data;
deriving process information from the process data; and
displaying select process information, which select process information includes the ratio of chemical change agent and water to coal feedstock.

20. The method of claim 19, wherein the select process information is represented by plots on a graph.

21. The method of claim 20, wherein the method further comprises the step of time averaging at least one of the plots.

22. The method of claim 20, wherein the graph is a circular graph.

23. The method of claim 22, wherein the display includes at least four (4) plots.

24. The method of claim 23, wherein the method further comprises the step of scaling the at least four plots so that no two plots cross under normal operating conditions.

25. The method of claim 24, wherein the method further comprises the step of viewing the graph remotely.

26. The method of claim 24, wherein the method further comprises the steps of generating an electric image of the graph, and viewing the electronic image from a remote location.

27. The method of claim 24, wherein the circular graph represents twenty-four (24) hours.

28. The method of claim 23, wherein the method further comprises the step of scaling at least two plots so that the scaled plots overlap under normal operating conditions.

29. The method of claim 23, wherein the method further comprises the step of time averaging the at least four plots.

30. The method of claim 23, wherein the method further comprises the step of saving electronically the process data.

31. A process of making synfuel, said process comprising the steps of
transporting coal feedstock to a synfuel processing facility;
sensing process data, which process data includes coal feedstock data and chemical change agent data;
deriving process information from the process data, which process information includes chemical change agent information and coal feedstock information;
applying chemical change agent to the coal feedstock based on the process information; and
plotting select process information on a graph, wherein said select process information includes a ratio of the amount of synfuel produced to the amount of chemical change agent used.

32. The process of making synfuel of claim 31, wherein, the graph is circular.

33. The process of claim 32, wherein, the graph represents twenty-four (24) hours.

34. The process of claim 33, wherein, the graph includes at least four plot lines.

35. The process of claim 34, wherein the select process information is scaled such that no two plots cross.

36. The process of claim 34, wherein the process information is scaled to plot along the same line.

37. The process of claim 34, wherein the system further comprises a camera positioned relative to the chart for generating an image of the chart, said images being adapted to be viewed from remote locations.

38. The process of claim 37, wherein, the images are available over the Internet.

39. The process of claim 34, wherein, an alert message is sent when the process information falls outside of a predetermined range.

40. The process of claim 39, wherein the alert message is an email, a message displayed on a control panel or monitor, an audible alarm, or a flashing light.

41. The process of claim 34, wherein the a display unit is used to graph the process information, which display unit comprises,
a circular chart;
at least four pen arms, each pen arm having a free end and a fixed end;
at least four pens;
wherein a pen is located at the free end of each pen arm and the fixed end of each pen arm is operably positioned with respect to the chart to graph the process information.

42. The process of claim 31, wherein the graph is presented on a video monitor.

43. The process of claim 31, wherein the amount of chemical change agent applied is password protected.

44. The process of claim 43, wherein changes to the amount of chemical change agent applied require entry of personal identification numbers.

* * * * *